(12) United States Patent
Van Landingham, Jr. et al.

(10) Patent No.: US 7,806,426 B2
(45) Date of Patent: Oct. 5, 2010

(54) ADJUSTABLE CART

(75) Inventors: A. Reneau Van Landingham, Jr., Stephens City, VA (US); Robert J. Tokash, Stephens City, VA (US); Ken Carper, Cincinnati, OH (US); Scott Zieker, Cincinnati, OH (US); Tom Remm, Milford, OH (US); Kevin Montgomery, Cincinnati, OH (US); Volker Werwick, Springboro, OH (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 138 days.

(21) Appl. No.: 11/752,139

(22) Filed: May 22, 2007

(65) Prior Publication Data

US 2008/0018078 A1    Jan. 24, 2008

Related U.S. Application Data

(60) Provisional application No. 60/802,158, filed on May 22, 2006, provisional application No. 60/899,008, filed on Feb. 2, 2007.

(51) Int. Cl.
*B62B 3/02* (2006.01)
(52) U.S. Cl. .................................... 280/651; 280/47.35
(58) Field of Classification Search ............. 280/47.18, 280/47.35, 651; 108/99, 179
See application file for complete search history.

(56) References Cited

U.S. PATENT DOCUMENTS

| | | | | |
|---|---|---|---|---|
| 3,064,989 | A | | 11/1962 | Bellows |
| 4,478,428 | A | * | 10/1984 | Ziliani ........................ 280/651 |
| 4,505,495 | A | * | 3/1985 | Foss et al. .................... 280/651 |
| 4,531,752 | A | * | 7/1985 | Diener ..................... 280/47.18 |
| 4,565,382 | A | * | 1/1986 | Sherman .................. 280/47.18 |
| D324,439 | S | | 3/1992 | Churchill et al. |
| 5,452,908 | A | * | 9/1995 | Bencic ..................... 280/47.35 |
| 5,460,399 | A | * | 10/1995 | Baechler et al. ............. 280/650 |
| 5,476,282 | A | | 12/1995 | Dahl |
| 5,536,034 | A | * | 7/1996 | Miller ......................... 280/651 |
| 6,196,560 | B1 | * | 3/2001 | Ohlsson ........................ 280/30 |
| 6,328,319 | B1 | * | 12/2001 | Stahler, Sr. ............... 280/47.18 |
| 6,419,244 | B2 | | 7/2002 | Meabon |
| 6,443,481 | B1 | * | 9/2002 | Stravitz et al. .............. 280/651 |
| 6,685,199 | B2 | * | 2/2004 | Stravitz et al. ................ 280/42 |
| 6,758,482 | B2 | * | 7/2004 | Stallbaumer ............. 280/47.27 |
| 6,929,250 | B2 | | 8/2005 | Blake et al. |
| 6,966,574 | B1 | * | 11/2005 | Dahl .......................... 280/651 |
| 6,991,250 | B2 | | 1/2006 | Lindsey et al. |
| 7,014,200 | B2 | * | 3/2006 | Calmeise et al. ......... 280/47.35 |
| 7,032,910 | B2 | | 4/2006 | Joie et al. |

(Continued)

*Primary Examiner*—Jeffrey J Restifo
(74) *Attorney, Agent, or Firm*—Foley and Larnder LLP (57) ABSTRACT

One embodiment of the invention relates to an adjustable cart including a upper platform with a front portion and a back portion, a lower platform with a front portion and a back portion, rolling members for movably supporting the lower platform, a first supporting member connected to the back portion of the lower platform, and a first rotational pivot structure connecting the first supporting member to the back portion of the upper platform to permit pivoting about a first pivot location. The upper platform is configured to rotate about the first rotational pivot structure from a first position substantially parallel to the lower platform to a second position substantially perpendicular to the lower platform during which the first pivot location moves away from the lower platform.

24 Claims, 8 Drawing Sheets

U.S. PATENT DOCUMENTS

| | | |
|---|---|---|
| 7,093,840 B2 | 8/2006 | Lucas et al. |
| 7,188,843 B2 * | 3/2007 | Magness ................... 280/30 |
| 7,306,245 B1 * | 12/2007 | Lowe ..................... 280/47.18 |
| 7,377,525 B1 * | 5/2008 | Whitmore .............. 280/47.34 |
| 7,377,538 B2 * | 5/2008 | Stuart et al. ............... 280/651 |
| 2004/0104560 A1 * | 6/2004 | Tedesco ..................... 280/651 |
| 2004/0108689 A1 | 6/2004 | Nguyen |
| 2006/0157944 A1 | 7/2006 | Alexander |
| 2007/0063486 A1 * | 3/2007 | Lin ........................... 280/651 |
| 2007/0152414 A1 * | 7/2007 | Home ..................... 280/47.35 |
| 2008/0018078 A1 * | 1/2008 | Van Landingham et al. . 280/651 |

* cited by examiner

ADJUSTABLE CART

CROSS REFERENCE TO RELATED APPLICATIONS

The present application claims priority to U.S. Provisional Patent Application Ser. Nos. 60/802,158, filed on May 22, 2006, and 60/899,008, filed Feb. 2, 2007, both of which are hereby incorporated by reference in their entireties.

FIELD

This disclosure relates to adjustable carts and, in particular, carts that can be adjusted between different positions.

BACKGROUND

Facilities maintenance personnel are known to use several different material handling carts in the same facility including multi-shelf utility carts, platform or hand trucks, and dollies. Different tasks may require different carts, which results in the personnel having to travel back and forth to find the correct cart for the job. Having multiple carts increases the time needed to find the correct cart. It also increases the storage space needed for carts. Some carts, such as hand trucks, have been developed that can be converted to different configurations. Such carts, however, often have limited uses and may require the removal of parts such as locking pins or supports to convert the cart from one configuration to another.

SUMMARY

One embodiment of the invention relates to an adjustable cart including a upper platform with a front portion and a back portion, a lower platform with a front portion and a back portion, rolling members for movably supporting the lower platform, a first supporting member connected to the back portion of the lower platform, and a first rotational pivot structure connecting the first supporting member to the back portion of the upper platform to permit pivoting about a first pivot location. The upper platform is configured to rotate about the first rotational pivot structure from a first position substantially parallel to the lower platform to a second position substantially perpendicular to the lower platform during which the first pivot location moves away from the lower platform.

Another embodiment of the invention relates to an adjustable cart including an upper platform with a front portion and a back portion, a lower platform with a front portion and a back portion, rolling members for movably supporting the lower platform, a first supporting member connecting the back portions of the first and lower platforms together via a first rotational pivot structure that pivots about a first pivot location, and a second supporting member connecting the front portions of the first and lower platforms together via a second rotational pivot structure. The upper platform is configured to rotate about the first rotational pivot structure from a first position substantially parallel to the lower platform to a second position substantially perpendicular to the lower platform during which the first pivot location moves away from the lower platform, the second rotational pivot structure slides on the second supporting member toward the lower platform, and the second supporting member rotates about a third rotational axis.

Another embodiment of the invention relates to an adjustable cart including a lower platform, and at least two rotatable members rotatable along a first rotational pivot structure. Each of the two supporting members has an aperture, and the two rotatable members project at a predetermined angle from the lower platform at a first position. The cart further includes a spring loaded mechanism for locking the at least two rotatable members into the first position. The spring loaded mechanism includes a pedal rotatable along a second rotational pivot structure, at least two link mechanisms connected to the pedal; a spring coupled to the link mechanisms for biasing the pedal in a depressed position; and a locking pin connected to each link mechanism for insertion into one of the apertures of a corresponding rotatable member. The locking pin is configured to be pulled out of the aperture of the corresponding rotatable member when the pedal is moved from the depressed position to a pressed position such that the rotatable members can pivot around the first rotational pivot structure.

Another embodiment of the invention relates to an adjustable cart including upper and lower platforms, rolling members for movably supporting the lower platform, a supporting member connecting portions of the first and lower platforms together; a first rotational pivot structure for allowing rotation of the upper platform from a first position substantially parallel to the lower platform at a first predetermined distance to a second position substantially perpendicular to the lower platform, and a second rotational pivot structure for allowing rotation of the upper platform from the second position substantially perpendicular to the lower platform to a third position substantially parallel to the lower platform at a second predetermined distance.

DETAILED DESCRIPTION OF THE PREFERRED EMBODIMENTS

Figure 1:
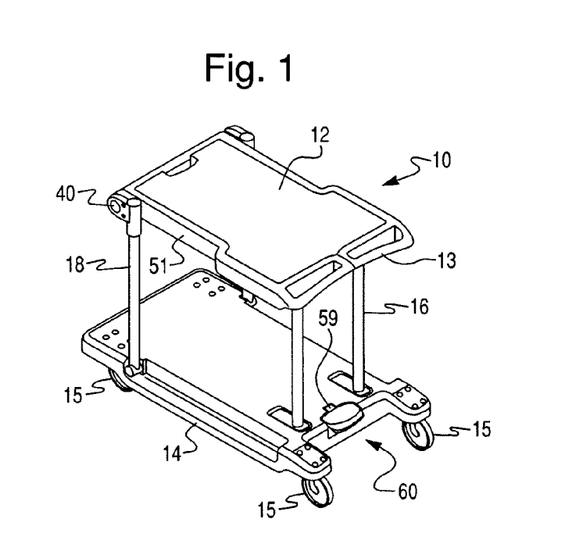
FIG. 1 is an isometric view of a cart according to an embodiment of the invention in a first configuration with an upper platform and a lower platform that are generally horizontal and spaced apart from each other.
Figure 2:
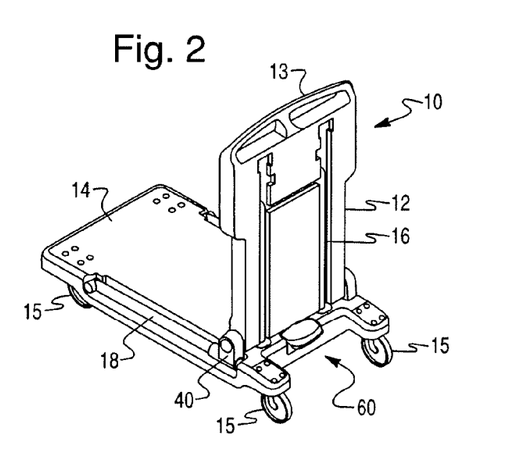
FIG. 2 is an isometric view of the cart of FIG. 1 in a second configuration with the upper platform in a generally vertical orientation.
Figure 3:
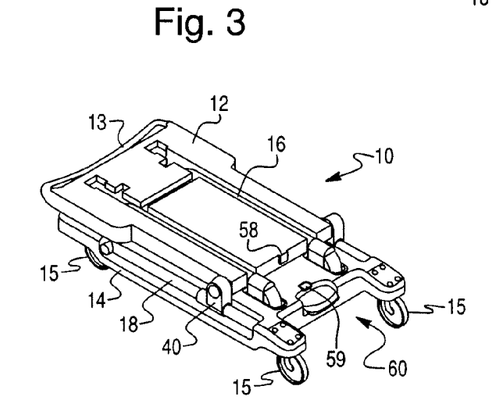
FIG. 3 is an isometric view of the cart of FIG. 1 in a third configuration with the upper platform and the lower platform in a generally horizontal orientation and the upper platform resting on the lower platform.

Referring in general to the figures and in particular to FIGS. 1-3 a cart 10 is shown according to an exemplary embodiment. The cart 10 preferably includes an upper platform 12, a lower platform 14, rolling members 15 coupled to the lower platform 14, a first supporting member 16 and a second supporting member 18 that are pivotably coupled to the upper platform 12 and lower platform 14, and a locking mechanism 60. The cart 10 preferably is configured to be adjustable between three configurations or positions. In the first configuration or position (e.g., two shelf cart configuration), shown in FIG. 1, the upper platform 12 and lower platform 14 are generally parallel and spaced apart to form two shelves. In a second configuration or position (e.g., platform truck configuration, etc.), shown in FIG. 2, the upper platform 12 is rotated down and is generally perpendicular to the lower platform 14. In a third configuration or position (e.g., storage configuration, etc.), shown in FIG. 3, the upper platform 12 folded against the lower platform 14 such that the upper platform 12 and lower platform 14 are generally parallel. Rolling members 15 (e.g., wheels, casters, etc.) coupled to the lower platform 14 allow a user to more easily move the cart 10 and any objects being supported by the cart 10 in any of the three configurations.

The upper platform 12 and lower platform 14 are generally flat members that are configured to support an object being transported with the cart 10. The upper platform 12 can include an integrally formed handle 13 that is configured to facilitate the movement of the cart. According to an exemplary embodiment, the upper 12 and lower 14 platforms are formed from an injection molded polymer such as a polypropylene or other comparable plastic resin. According to other exemplary embodiments, the upper 12 and lower 14 platforms may be formed from a metal, fiberglass, or other suitable material.

The first supporting member 16 is pivotably coupled to a back portion of the upper platform 12 and a back portion of the lower platform 14. The second supporting member 18 is pivotably coupled to a front portion of the upper platform 12 and a front portion of the lower platform 14. According to an exemplary embodiment, the first 16 and second 18 supporting members are formed at least partially from steel tubes with generally circular cross-sections. According to other exemplary embodiments, the first 16 and second 18 supporting members may be formed from a high-strength polymer, fiberglass, or other suitable material. According to other exemplary embodiments, the first 16 and second 18 supporting members may be formed from components with other cross-section shapes (e.g. oval, square, etc.).

Figure 4:
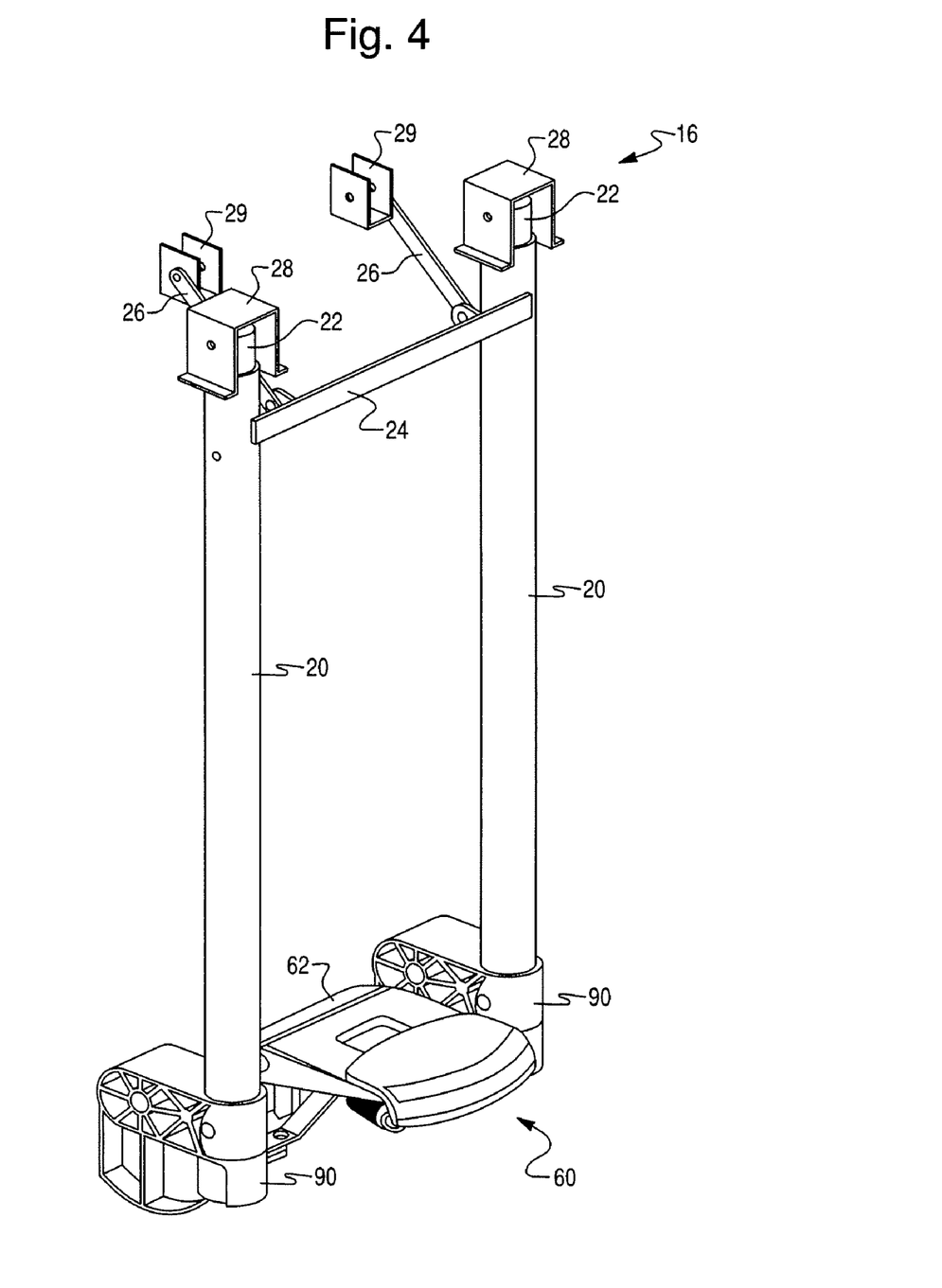
FIG. 4 is an isometric view of the first supporting member of the cart of FIG. 1.
Figure 5:
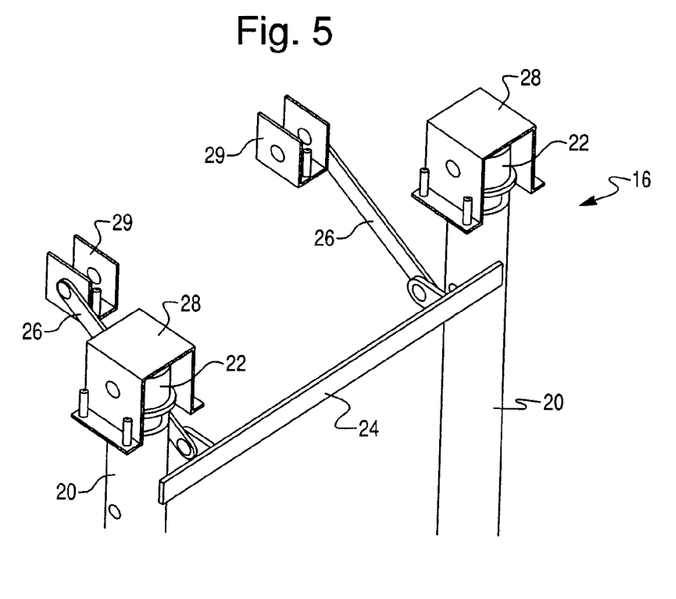
FIG. 5 is an isometric view of a portion of the first supporting member of FIG. 4 showing brackets used to couple the first supporting member to the upper platform.
Figure 6:
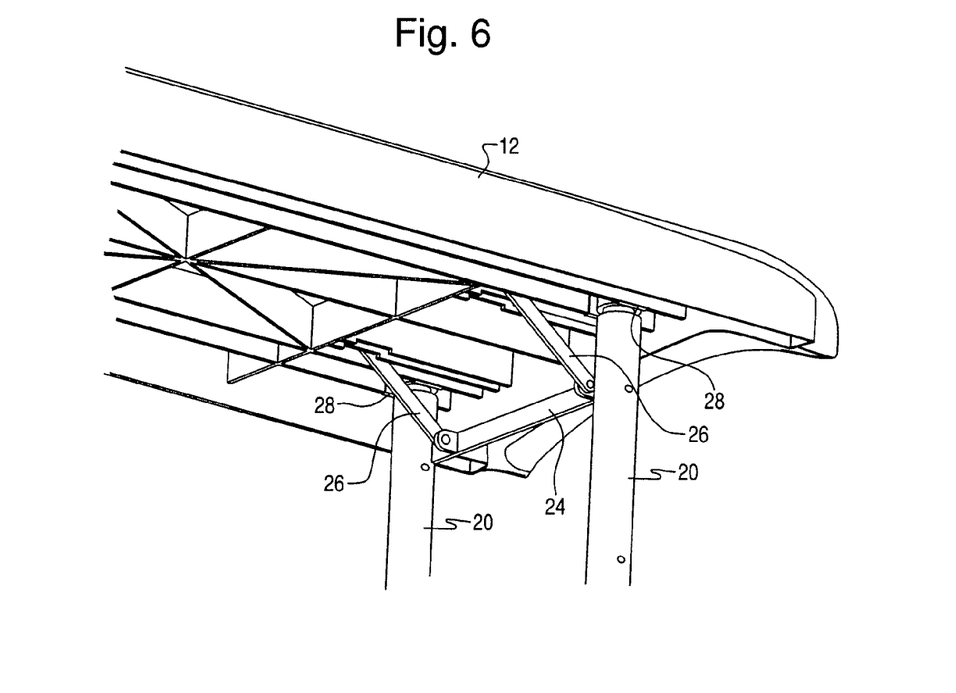
FIG. 6 is an isometric view of the first supporting member coupled to the upper platform in the cart of FIG. 1.

Referring now to FIGS. 4-6, the first supporting member 16 is shown according to an exemplary embodiment. The first supporting member 16 includes two generally parallel outer tubes 20 that serve as the back legs of the cart 10, two telescoping inner tubes 22 that are provided inside the outer tubes 20, a cross member 24 that is coupled to the outer tubes 20, two links 26 that are pivotably coupled to the cross member 24, and brackets 28 and 29 that couple the links 26 and inner tubes 22 to the upper platform 12. The first supporting member 16 further includes bottom portions or feet 90 that are coupled to the lower platform 14.

The outer tubes 20 and inner tubes 22 are generally hollow members with a circular cross-section. The outer tubes 20 have an inner diameter that is greater than the outer diameter of the inner tubes 22 such that the inner tubes 22 nest within the outer tubes 20 and extend past the top of the outer tubes 20. The cross member 24 is oriented generally perpendicular to the outer tubes 20 and is coupled to the outer tubes proximate to the top of the outer tubes 20. Two bars or links 26 are pivotably coupled to the cross member 24 proximate to the outer tubes 20. The inner tubes 22 and the links 26 are pivotably coupled to the back portion of the upper platform 12 with brackets 28 and 29, respectively. As will be described in more detail later in the application, brackets 28 and 29 provide pivot points that move upward vertically as the front portion of the upper platform 12 is rotated downward.

Figure 7:
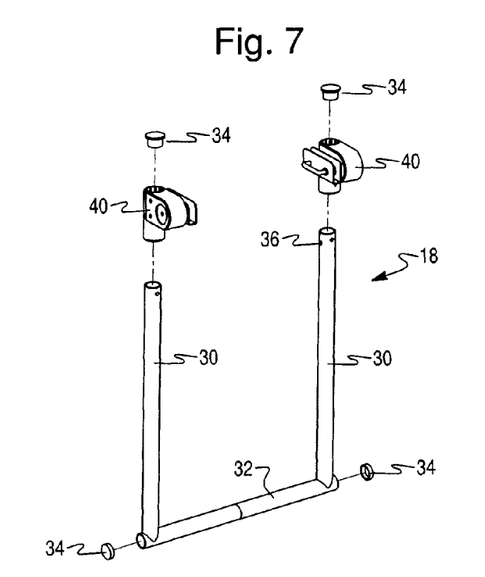
FIG. 7 is a partially exploded view of the second supporting member and sliding joints of the cart of FIG. 1.
Figure 8:
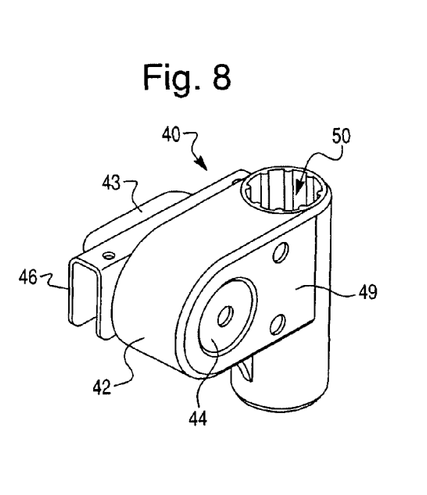
FIGS. 8 and 9 are isometric views of one of the sliding joints of FIG. 7.
Figure 9:
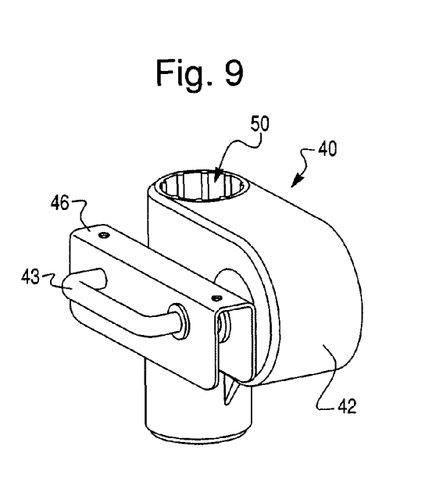
Figure 10:
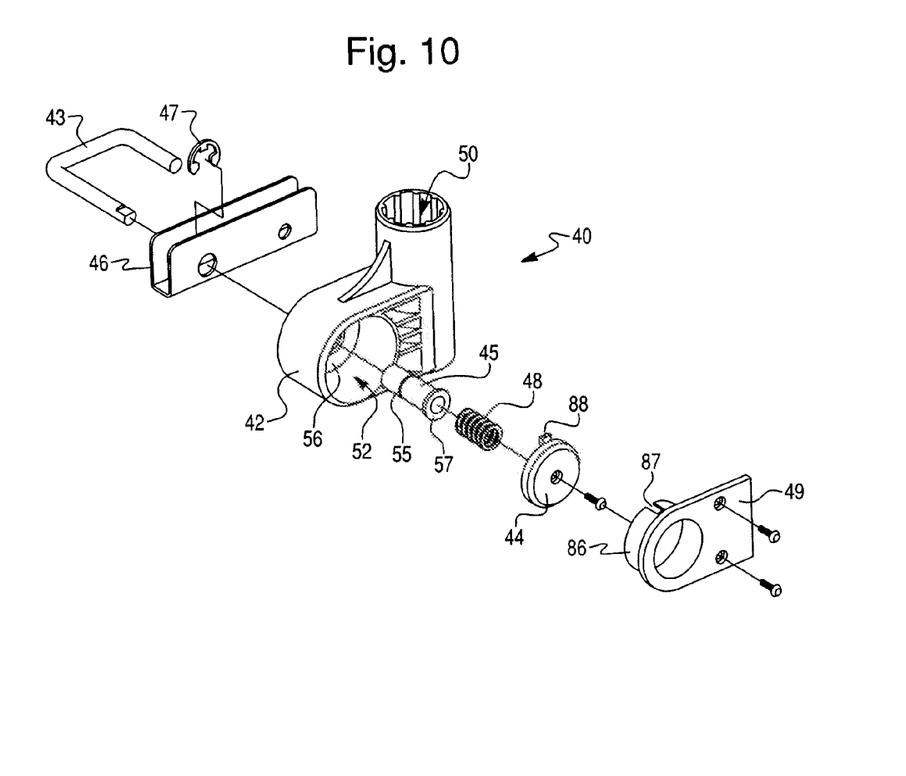
FIG. 10 is an exploded view of one of the sliding joints of FIG. 7.

Referring now to FIG. 7, the second supporting member 18 is shown according to an exemplary embodiment. The second supporting member 18 includes two generally parallel legs 30 and a connecting portion 32 that is generally perpendicular to the legs 30 and is received by openings in the lower platform 14 to couple the second supporting member 18 to the lower platform 14. Sliding joints 40 are coupled to the legs 30 and the upper platform 12 to couple the second supporting member 18 to the upper platform 12. Plugs or ends 34 may be provided to close the open ends of the legs 30 and/or the connecting portion 32. Apertures 36 are provided in the legs 30 that may be aligned with corresponding features in the sliding joints 40.

Referring now to FIGS. 8-11B sliding joint 40 is shown according to an exemplary embodiment. The sliding joint 40 includes a main body 42, a retractable protrusion shown as a U-shaped pin or latch 43, a button 44 that allows a user to move the latch 43, a bushing 45, a bracket 46 that facilitates coupling the sliding joint 40 to the upper platform 12, a retaining member 47, a biasing member 48, and an outer faceplate 49.

The housing or main body 42 of the sliding joint 40 is a generally L-shaped body that includes a first opening 50 (e.g., shaft, hole, bore, etc.) that receives one of the legs 30 of the second support member 18, and a second opening 52 that receives at least a portion of the latch 43. According to one exemplary embodiment, the latch 43 is a generally U-shaped body that includes one arm or end that is received within the second opening 52 and an opposite arm or end that engages an aperture 54 in the main body 42 proximate to the first opening 50. A button 44 is provided proximate to one end of the second opening 52. A bushing 45 is held in the second opening 52 by an inwardly extending wall or flange 56. The bushing 45 includes an outwardly extending flange 57 that contacts flange 56 to limit the movement of the bushing 45 in the second opening 52. An end of the latch 43 passes through the bushing 45 and contacts the button 44. The latch 43 extends past the sliding joint 40 through an opening in the side wall 51 of the upper platform 12 to rotatably couple the sliding joint 40 to the upper platform 12. The latch passes through a bracket 46 opposite of the main body 42. A retaining member, shown as a c-clip 47 engages a groove 55 in the bushing 45 to couple the bracket 46 to the main body 42. A biasing member, shown as coil spring 48 is provided between the bushing 45 and the button 44 to bias the button 44 away from the bushing 45. A faceplate 49 is coupled to the main body 42 to retain the bushing 45, coil spring 48, and button 44 in the second opening 52. The faceplate 49 includes an inwardly extending wall 86 that includes an opening or slot 87 that is configured to receive a corresponding tab 88 that extends outward from the button 44 when the button 44 is in a depressed or rest position.

Figure 11A:
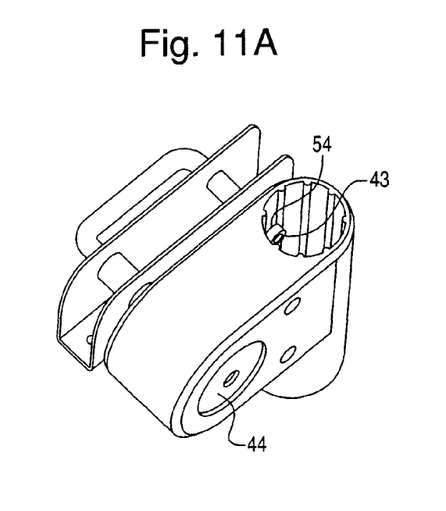
FIG. 11A is an isometric view of one of the sliding joints of FIG. 7 showing a retractable protrusion in an engaged position.
Figure 11B:
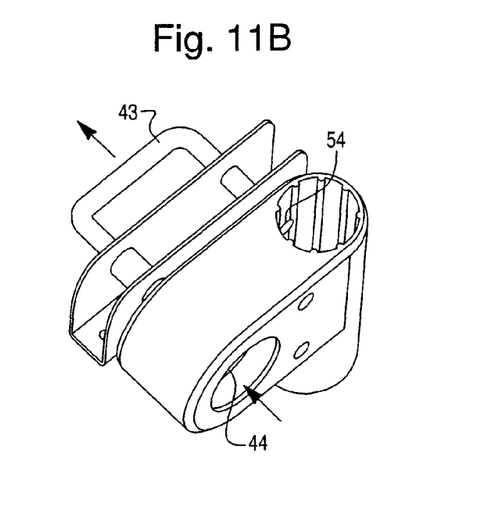
FIG. 11B is an isometric view of one of the sliding joints of FIG. 7 showing a retractable protrusion in an disengaged position.

Referring now especially to FIGS. 11A and 11B, the operation of the latch 43 is shown in more detail. As shown in FIG. 11A, in a first position, one end of the latch 43 is disposed in the aperture 53 in the main body 42 and extends into the first opening 50. The end of the latch 43 further engages the aperture 36 in the leg 30 received within the first opening 50 to prevent the sliding joint 40 from sliding along the longitudinal axis of the leg 30. As shown in FIG. 11B, in a second position, the button 44 is pushed into the second opening 52. The button 44, compresses the coil spring 48 and disengages the latch 43 from the aperture 36 in the leg 30 of the second supporting member 18. When the latch 43 is disengaged from the aperture 36, the sliding joint is allowed to slide freely along the longitudinal axis of the leg 30.

Once button 44 is pressed, tab 88 on button 44 disengages from the slot 87 of cover 49. The button 44 is coupled to the latch 43 and, in turn, to the upper platform 12 and the faceplate 49 is coupled to the main body 42 and, in turn, to the second supporting member 18. As the second supporting member 18 rotates relative to the upper platform 12, the tab 88 is rotated away from the slot 87 and rides along the end of the wall 87, causing the button 44 to remain retracted within the second opening 52. When the upper platform 12 and the second supporting member 18 rotates to a locking position (e.g., the first, second, or third position), the tab 88 engages the slot 87, allowing the latch 43 to return to a locking position.

Figure 12A:
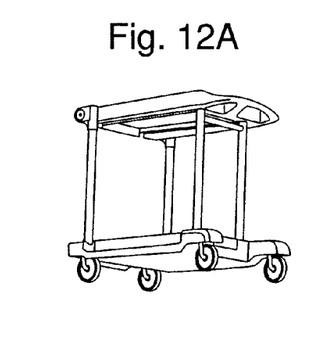
FIGS. 12A-12E are isometric views of the cart of FIG. 1, showing the cart being reconfigured from a first configuration to a second configuration.
Figure 12B:
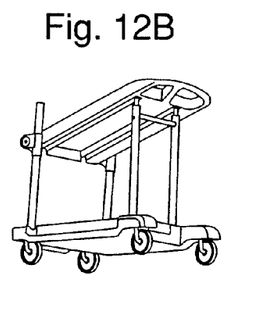
Figure 12C:
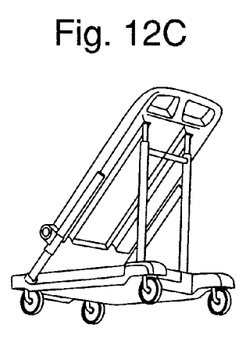
Figure 12D:
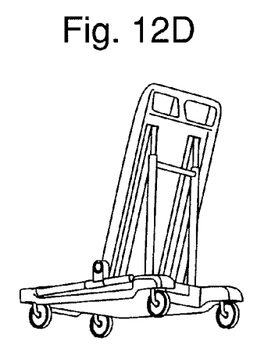
Figure 12E:
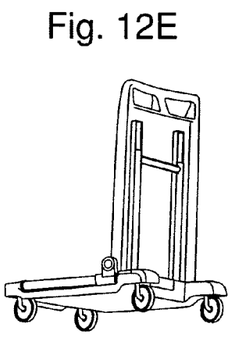

Referring now to FIGS. 12A-E, the cart 10 is shown being converted from a first position or configuration to a second position or configuration. A user begins by pressing the buttons 44 on the sliding joints 40 to disengage the latches 43 from the apertures 36 in the second supporting member 18. The front portion of upper platform 12 and the sliding joints 40 is allowed to move downward as the second supporting member 18 pivots on the connecting portion 32. During the conversion from the first position to the second position, the sliding joints 40 move down the legs 30 of the second supporting member 18 until the upper platform 12 is partially rotated, as shown in FIG. 12C, then begin sliding back up the legs 30. As the front portion of the upper platform 12 rotates downward, the back portion of the upper platform 12 pivots on brackets 28 and 29 and moves away from the lower platform 14. The movement of the back portion of the upper platform 12 relative to the lower platform 14 allows the length of the upper platform 12 to be greater than the distance between the upper platform 12 and the lower platform 14 when the cart is in the first configuration. The upper platform is rotated downward to a generally vertical orientation and the second supporting member 18 is rotated to a generally horizontal orientation to convert the cart 10 to the second position. The upper platform 12 includes a coupling mechanism, shown as protrusion 58 on the front portion of the upper platform 12, shown best in FIG. 3. The protrusion 58 engages a recess 59 provided in the lower platform 14 to help retain the cart in the second position.

Figure 13A:
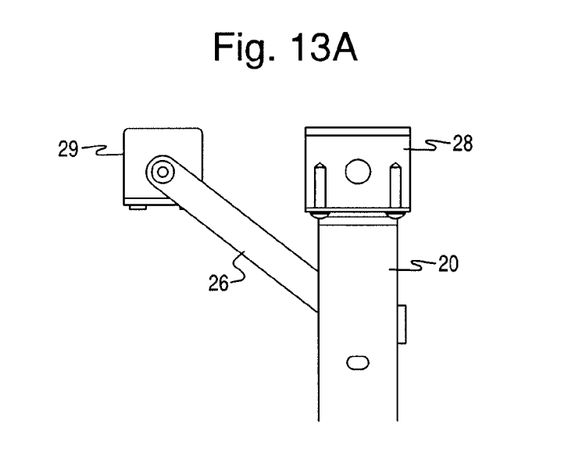
FIG. 13A-13C are side views of the cart of FIG. 1 showing the top portion of the first supporting member as the cart is moved from a first position to a second position.
Figure 13B:
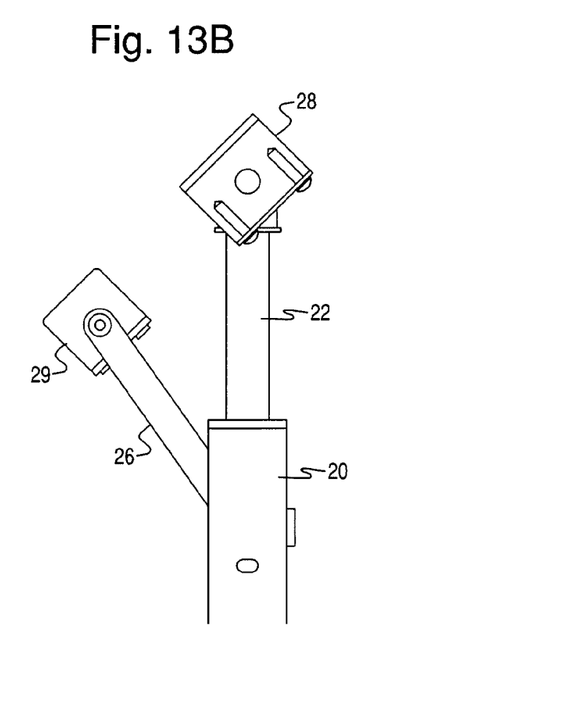
Figure 13C:
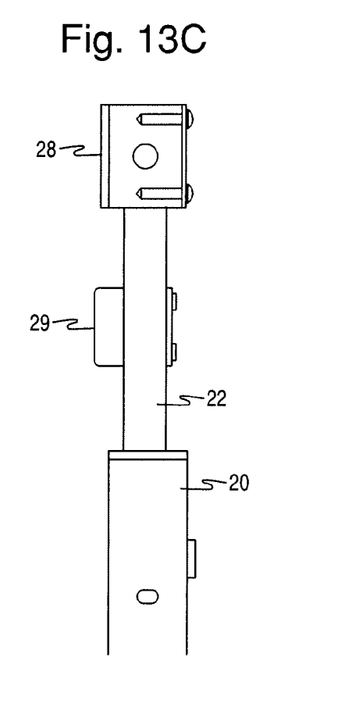

Referring now to FIGS. 13A-C the first supporting member is shown in more detail as the cart is adjusted from the first position to the second position. As the upper platform 12 (not shown in FIGS. 13A-C for clarity) is rotated downward, brackets 29 rotate toward the back of the cart 10 on links 26. Because brackets 28 and 29 are both coupled to the upper platform 12 and the distance between brackets 28 and 29 is fixed, brackets 28 are forced upward as brackets 29 move toward the back of the cart 10. The inner tubes 22 telescope out of the outer tubes 20 as the brackets 28 move upward. Because the brackets 28 and 29 move upward as the upper platform 12 is moved from the first position to the second position, the distance between the upper platform 12 and the lower platform 14 may be less than the length of the upper platform 12.

Figure 14:
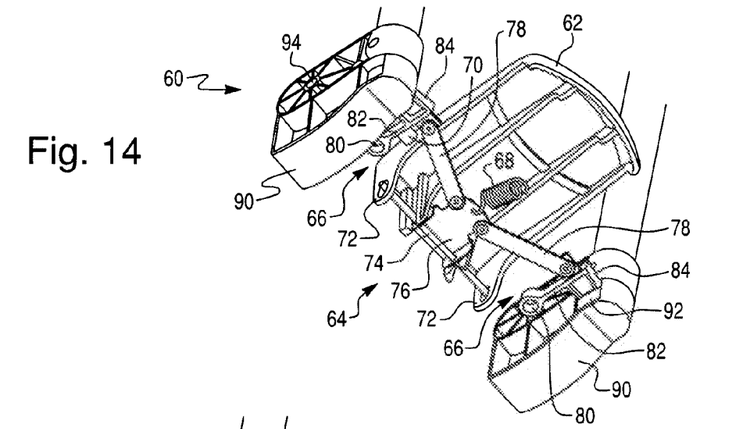
FIG. 14 is an isometric view of the spring loaded mechanism of the cart of FIG. 1 with locking pins that are engaged with apertures in the first supporting member.
Figure 15:
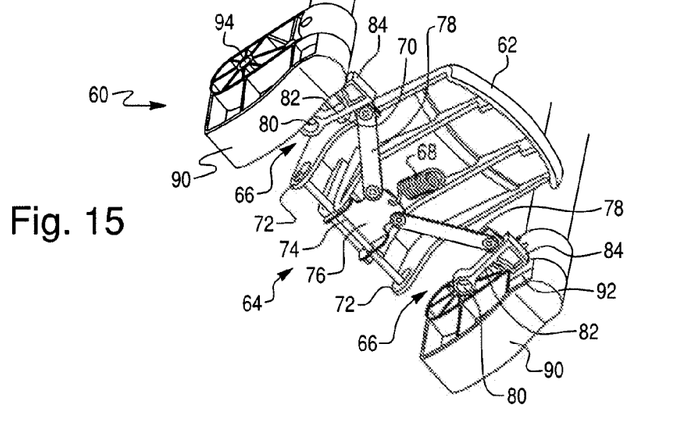
FIG. 15 is an isometric view of the spring loaded mechanism of the cart of FIG. 1 with locking pins that are disengaged with apertures in the first supporting member.
Figure 16:
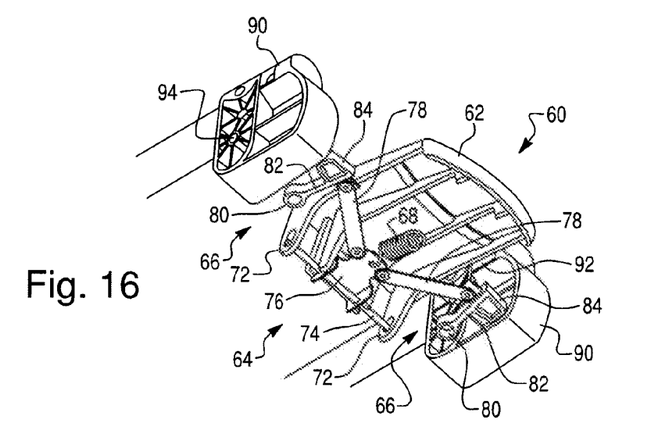
FIG. 16 is an isometric view of the spring loaded mechanism of the cart of FIG. 1 with locking pins that are disengaged with apertures in the first supporting member and the first support member folded down in a generally horizontal orientation.

Referring now to FIGS. 14-16, a spring-loaded locking mechanism 60 is shown according to an exemplary embodiment. The locking mechanism 60 is configured to selectively fix the first supporting member 16 in a generally vertical orientation (i.e., in the first and second configurations of the cart 10). The locking mechanism includes a switch or pedal 62 that is moveable between a first and second position, a linkage 64 that is coupled to the pedal, locking pins or latches 66 that are coupled to the linkage 64 and are actuated by the pedal 62 as it moves between the first and second positions, and a biasing member, shown as spring 68 that biases the locking mechanism towards the first position.

The pedal 62 is received in a opening in the back portion of the lower platform 14 and pivots between a first position and a second position along pivots 70. In the first position or depressed position, shown in FIG. 14, the pedal 62 presents a generally continuous surface with the top of the lower platform 14 and the locking pins 66 are engaged with the first supporting member 16. In the second position or pressed position, the pedal 62 is pressed downward and the locking pins 66 are disengaged from the first supporting member 16, allowing it to rotate downward as shown in FIG. 3. The pedal 62 includes downwardly extending arms or walls 72 and a shaft or rod 74 that is received by openings in the walls 72.

The linkage 64 is coupled to the pedal 62 and the locking pins 66. According to an exemplary embodiment, the linkage include a first link 76 coupled to the pedal 62, and a second and third links 78 coupled to the first link and to the locking pins 66. The first link 76 is pivotably coupled to the rod 74 and moves towards the front of the cart 10 as the pedal 62 is moved from the depressed position to the pressed position. The locking pins 66 include a striker portion 80 and an arm 82. The locking pins 66 are coupled to the ends of the second and third links 78 and rotate about a pivot 84 as the pedal 62 is moved between a depressed position and a pressed position. The spring 68 is coupled to the first link 76 and to the lower platform 14. The spring 68 is extended as the locking mechanism 60 moves from a first position to a second position. For clarity, the spring 68 is shown only coupled to the first link 76 in FIGS. 14-16.

As shown in FIG. 14, when the locking mechanism 60 is in the first position, the striker portions 80 of the locking pins 66 engage apertures 92 in the bottom portions 90 of the first supporting member 16. The first supporting member 16 is coupled to the lower platform 14 at pivot points 94 (e.g., with bolts) and rotates about pivot points 94. The locking pins 66 prevent the first supporting member 16 from rotating when the locking mechanism is in the first position.

As shown in FIG. 15, when the pedal 62 is pressed down (e.g., by a user's foot), the first link 76 is pulled towards the front of the cart 10 and the spring 68 is extended. The second and third links 78 rotate the locking pins 66 about the pivots 84, disengaging the striker portions 80 from the apertures 92 in the bottom portions 90 of the first supporting member 16.

When the locking mechanism 60 is in the second position, the first supporting member 16 is allowed to rotate downward about the pivot points 94 as shown in FIG. 3 and FIG. 16. In the third configuration or position, shown in FIG. 3, the cart 10 provides a generally flat wheeled platform. In the third position, shown in FIG. 3, the cart 10 is configured to be able to be stood on its side (e.g., for storage).

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

Although the invention has been described above by reference to certain embodiments of the invention, the invention is not limited to the embodiments described above. Modifications and variations of the embodiments described above will occur to those skilled in the art in light of the above teachings.

What is claimed is:

1. An adjustable cart comprising:
    a upper platform with a front portion and a back portion;
    a lower platform with a front portion and a back portion;
    rolling members for movably supporting the lower platform;
    a first supporting member connected to the back portion of the lower platform; and
    a first rotational pivot structure connecting the first supporting member to the back portion of the upper platform to permit pivoting about a first pivot location,
    wherein the upper platform is configured to rotate about the first rotational pivot structure from a first position substantially parallel to the lower platform to a second position substantially perpendicular to the lower platform during which the first pivot location moves away from the lower platform,
    wherein the first supporting member comprises an outer tube and an inner telescoping tube with the inner telescoping tube being connected to a portion of the upper platform,
    wherein the first rotational pivot structure is configured to raise the portion of the upper platform connected to the inner telescoping tube relative to the lower platform in response to rotation of the upper platform from the first position to the second position, and
    wherein the first rotational pivot structure is configured such that the rotation of the upper platform causes the inner telescoping tube connected to the portion of the upper platform to rise.

2. The adjustable cart according to claim 1, further comprising a second supporting member connected to the front portion of the upper platform and the front portion of the lower platform.

3. The adjustable cart according to claim 2, wherein the front portion of the upper platform is configured to slide down the second supporting member during a portion of the rotation of the upper platform from the first position toward the second position and to slide up the second supporting member during a subsequent portion of the rotation of the upper platform from the first position toward the second position.

4. The adjustable cart according to claim 3, wherein the second supporting member is configured to rotate about a second rotational pivot structure when the upper platform is rotated from the first position to the second position.

5. The adjustable cart according to claim 3, further comprising a sliding joint connecting the upper platform to the second supporting member.

6. The adjustable cart according to claim 5, wherein the sliding joint comprises:
    a body with a second rotational pivot structure such that the front portion of the upper platform is rotatable about the sliding joint;
    an aperture in the body into which the second supporting member is inserted such that the sliding joint is slidable along a longitudinal axis of the second supporting member; and
    a retractable protrusion that is configured to extend into and retract from the aperture in the body such that the sliding joint can be held in place along the longitudinal axis of the second supporting member.

7. The adjustable cart according to claim 1, wherein the first rotational pivot structure comprises brackets attached to the inner telescoping tube of the first supporting member.

8. The adjustable cart according to claim 1, further comprising a mechanism for locking the upper platform into the second position.

9. The adjustable cart according to claim 1, further comprising a second rotational pivot structure configured to permit the upper platform and the first supporting member to rotate about the second rotational pivot structure from the second position substantially perpendicular to the lower platform to a third position substantially parallel to the lower platform.

10. An adjustable cart comprising:
    a upper platform with a front portion and a back portion;
    a lower platform with a front portion and a back portion;
    rolling members for movably supporting the lower platform;
    a first supporting member connecting the back portions of the upper and lower platforms together via a first rotational pivot structure that pivots about a first pivot location; and
    a second supporting member connecting the front portions of the upper and lower platforms together via a second rotational pivot structure,
    wherein the upper platform is configured to rotate about the first rotational pivot structure from a first position substantially parallel to the lower platform to a second position substantially perpendicular to the lower platform during which the first pivot location moves away from the lower platform, the second rotational pivot structure slides on the second supporting member toward the lower platform, and the second supporting member rotates about a third rotational pivot structure.

11. The adjustable cart according to claim 10, wherein the second rotational pivot structure is connected to a sliding joint connecting the upper platform to the second supporting member.

12. The adjustable cart according to claim 11, wherein the sliding joint comprises:
    a body with an aperture in which the second supporting member is inserted such that the sliding joint is slidable down the second supporting member, and
    a retractable protrusion that is configured to extend into and retract from the aperture in the body such that the sliding joint can be held in place along a longitudinal axis of the second supporting member.

13. The adjustable cart according to claim 12, wherein the protrusion fits inside at least one additional aperture in the second supporting member such that the joint is held in place along the longitudinal axis of the second supporting member.

14. The adjustable cart according to claim 10, wherein the first rotational pivot structure is configured to move the first pivot location away from the lower platform to such a distance that only a protrusion from the front portion of the upper platform contacts a surface of the lower platform when the upper platform is being placed into the second position.

15. The adjustable cart according to claim 10, wherein the first supporting member comprises an outer tube and an inner telescoping tube, and wherein the first rotational pivot structure comprises brackets attached to the inner telescoping tube of the first supporting member.

16. The adjustable cart according to claim 10, further comprising a mechanism for locking the upper platform into the second position.

17. The adjustable cart according to claim 10, further comprising a fourth rotational pivot structure configured to permit the upper platform and first supporting member to rotate about the fourth rotational pivot structure from the second position substantially perpendicular to the lower platform to a third position substantially parallel to the lower platform.

18. An adjustable cart comprising:
 a lower platform;
 an upper platform;
 at least two rotatable supporting members supporting the upper platform and rotatable along a first rotational pivot structure, wherein each of the two rotatable supporting members has an aperture, wherein the two rotatable supporting members project at a predetermined angle from the lower platform at a first position to support the upper platform; and
 a spring loaded mechanism for locking the at least two rotatable supporting members into the first position, wherein the spring loaded mechanism comprises:
  a pedal rotatable along a second rotational pivot structure;
  a spring for biasing the pedal in a depressed position;
  at least two link mechanisms connected to the pedal; and
  a locking pin connected to each link mechanism for insertion into one of the apertures of a corresponding rotatable supporting member,
 wherein each locking pin is configured to be pulled out of the aperture of the corresponding rotatable supporting member when the pedal is moved from the depressed position to a pressed position such that the rotatable supporting members can pivot around the first rotational pivot structure.

19. The adjustable cart according to claim 18, wherein the upper platform has a front portion and a back portion,
 wherein a third rotational pivot structure connects the at least two rotatable supporting members to the back portion of the upper platform,
 wherein the at least two rotatable supporting members are connected to a back portion of the lower platform,
 wherein the upper platform is configured to rotate about the third rotational pivot structure from a position substantially parallel to the lower platform to a position substantially perpendicular to the lower platform.

20. The adjustable cart according to claim 19, further comprising a front supporting member connecting the front portion of the upper platform and a front portion of the lower platform together, and
 wherein the front portion of the upper platform is configured to slide down the front supporting member when the upper platform is rotated from the substantially parallel position toward the substantially perpendicular position.

21. The adjustable cart according to claim 20, further comprising a sliding joint connecting the upper platform to the front supporting member.

22. The adjustable cart according to claim 19, wherein each of the rotating supporting members comprises an outer tube and an inner telescoping tube, and wherein the third rotational pivot structure comprises brackets attached to the inner telescoping tube of each of the rotating supporting members.

23. The adjustable cart according to claim 19, wherein the spring loaded mechanism is configured for locking the upper platform into the position substantially perpendicular to the lower platform, and wherein the position substantially perpendicular to the lower platform is the first position.

24. The adjustable cart according to claim 18, wherein the first rotational pivot structure is configured to permit the at least two rotating supporting members to rotate about the first rotational pivot structure from the first position to a second position substantially parallel to the lower platform.

* * * * *